(12) United States Patent
Ellis et al.

(10) Patent No.: US 8,038,739 B2
(45) Date of Patent: Oct. 18, 2011

(54) MANUFACTURING METHOD

(75) Inventors: Keith Ellis, Nottingham (GB); Andrew Hill, Nottingham (GB); John Hill, Sheffield (GB)

(73) Assignee: Atraverda Limited, Abertillery (GB)

( * ) Notice: Subject to any disclaimer, the term of this patent is extended or adjusted under 35 U.S.C. 154(b) by 1274 days.

(21) Appl. No.: 11/569,455

(22) PCT Filed: Jun. 3, 2005

(86) PCT No.: PCT/GB2005/002195
§ 371 (c)(1),
(2), (4) Date: Nov. 21, 2006

(87) PCT Pub. No.: WO2005/120792
PCT Pub. Date: Dec. 22, 2005

(65) Prior Publication Data
US 2007/0231938 A1    Oct. 4, 2007

(30) Foreign Application Priority Data

Jun. 9, 2004  (GB) .................................. 0412921.9
Apr. 7, 2005  (GB) .................................. 0507034.7

(51) Int. Cl.
H01M 4/82 (2006.01)
H01M 6/00 (2006.01)
H01M 4/64 (2006.01)
H01M 4/72 (2006.01)
H01M 4/74 (2006.01)

(52) U.S. Cl. ........ 29/623.4; 29/623.2; 429/233; 429/241
(58) Field of Classification Search ................ 29/623.1, 29/623.5, 623.4, 623.2; 429/233, 241
See application file for complete search history.

(56) References Cited

U.S. PATENT DOCUMENTS

| 3,803,378 | A | * | 4/1974 | Pearson et al. ............... 219/104 |
| 4,091,192 | A | * | 5/1978 | Scholle .......................... 429/211 |
| 7,378,187 | B2 | * | 5/2008 | Kim ............................... 429/185 |
| 7,541,113 | B2 | * | 6/2009 | Partington .................. 429/231.5 |
| 2004/0072074 | A1 | | 4/2004 | Partington |

FOREIGN PATENT DOCUMENTS

| WO | 95/03632 | | 2/1995 |
| WO | WO 02/058174 | * | 7/2002 |

OTHER PUBLICATIONS

International Search Report re PCT/GB2005/002195 mailed Sep. 16, 2005.

* cited by examiner

*Primary Examiner* — Patrick Ryan
*Assistant Examiner* — Julian Anthony
(74) *Attorney, Agent, or Firm* — Caesar, Rivise, Bernstein, Cohen & Pokotilow, Ltd.

(57) ABSTRACT

A method of making an article comprises a heat cured composition with at least one foil or sheet applied on one face of the cured composition. The article may be an electrode. The composition may comprise titanium suboxide.

22 Claims, 3 Drawing Sheets

MANUFACTURING METHOD

The invention concerns a method of manufacture and more particularly a method of speedily moulding heat curable compositions to form shaped articles.

BACKGROUND OF THE INVENTION

Patent application, PCT/GB02/00230, published under no. WO 02/058174 on 25 July 2002, describes and claims an electrode for a battery, the electrode comprising a shaped substantially pore-free body of hardened resin and having electrical paths defined by contacting conductive particles. It is intended that by this reference the entire disclosure of this application is incorporated herein. In one embodiment the electrode is in flat form, i.e. a plate. Various methods of manufacture are disclosed, including manufacture by pressing a heat-curing or thermosetting composition in a heated mould. In one disclosed method, thin metallic foils are placed in the pressing moulds, the composition added, and a top foil applied, the mould is then closed and pressure is applied. The formed part is then ejected.

In order to maximise the rate at which such parts can be formed, it is preferred to have the mould tool operating at a high temperature to reduce the cure time. When raised to high temperatures the viscosity of the resin/hardener composition decreases in a few seconds and the composition commences to gel within a few more seconds.

Hence a rapid and convenient way of introducing the metallic foils and composition to the mould cavity is required.

It is one object of this invention to provide a method for delivering a composition to the mould cavity such that the mould can be closed quickly in order to minimise and prevent problems arising from premature curing in a high temperature mould. Another object of this invention relates to removing the formed article quickly to maximise the availability and productivity of the press.

SUMMARY OF THE INVENTION

In one aspect the invention provides a method of making an article comprising a heat-cured composition with a metallic foil, or a non-metallic sheet on one or more faces, the method comprising:
  advancing a vessel containing a heat curable composition to a heated and open mould cavity, the vessel having an open bottom, a first foil or sheet closing the open bottom of the vessel;
  releasing the foil or sheet to cause the heat curable composition to locate in an open mould cavity;
  optionally applying a second foil or sheet to close the container;
  closing the heated mould cavity and applying pressure to form an article and allowing a period of time to cure the composition; and
  withdrawing a formed article from the mould.

In another aspect the invention provides a multipart part jig for carrying out any two, three or four of the steps, the jig comprising a first part to provide the vessel to house the composition, and a second part to close the open top of the vessel, and a third part to withdraw the formed article from the mould.

The method is particularly suitable for forming generally planar articles, with foils or sheets applied to one or more major faces thereof.

Thermoset resins are particularly suitable for the manufacturing of good conductivity plates since they are handled in a hot press, which also presses the particles together for intimate electronic contact, and they may also shrink somewhat on curing, further pushing the particles together. Other candidate thermoset resins include epoxyphenols, novolac resins, bisphenol A based epoxy resins, bisphenol F epoxy resins; polyesters (saturated, unsaturated, isophthalic, orthophthalic, neopentylglycol modified, modified vinylester, vinylester urethane and the like.

Low shrink and other additives may be included in commercial grades of these resins, provided that they do not have a detrimental effect on the chemical stability of the resin in the acid electrolyte. Some polymers have been shown to be unstable in the polarised presence of an acid electrolyte. Some commercial resins have a mould release agent preblended in the mixture and these should be avoided in this application since they can adversely affect the adhesion of the active battery materials and potentially affect the corrosion stability of the plate and also the surface chemistry (surface tension etc.) of the battery acid electrolyte. The chosen resin will preferably be one which is resistant to the electrolyte acid, especially where the electrode is for bipolar batteries.

Coupling agents such as silanes to contact the surface of the particles may be used to improve the adhesion and wetting of the resin to the suboxide particles to enhance low porosity and high mechanical strength. The coupling and/or wetting agents (such as silanes and other surfactants) can be advantageously used on plates which do not have the metallic layer imposed. The pasting of the plates is carried out in the usual way, with conventional leady oxide paste or other lead containing pastes. The existence of the impressed surface features means that a controlled volume of paste is applied to the grid area of the plates; pasting with thicker or thinner layers can be managed by having the grid higher or lower. It is also possible, by adjusting the shape of the mould to have some areas with thick paste and other with thin paste in order to optimise the discharge characteristics of the battery. The paste on the electrode can be cured in the usual way.

With cured plates, a battery may be assembled using a number of bipolar plates, appropriately oriented, and a single positive monopole at one end and a single negative monopole at the other. Absorptive glass mats can be advantageously inserted between each plate. Sealing of the plates is achieved in the laboratory by the use of gaskets of appropriate thickness and made of say butyl or silicone rubber sheet. The entire assembly is held together by metal straps and bolts of suitable length. In a commercial battery, in a preferred feature of the invention, the plates are sealed into a pre-moulded plastic container, with slots for each plate. A certain amount of compression of the glass mat and of the paste can be engendered by correct dimensioning of the container. Such compression has been found to aid the adhesion of the paste to the bipolar electrode substrate. Low concentration sulphuric acid can be added followed by a lid having grooves which will seal onto the edges of each plate, placed on the top. The lid can advantageously also contain a suitable gas pressure regulating system.

The battery is then electrically formed in the usual way. As the formation takes place, then the acid increases in strength, by the conversion of the sulphate-containing paste to $PbO_2$ on the positive plate and Pb metal on the negative. The initial strength of the sulphuric acid should be chosen to ensure that the final strength of the acid is in the range 30-40% by mass of sulphuric acid, or even higher.

Phosphoric acid can also be advantageously added in part or total replacement of the more usual sulphuric acid.

Batteries made by this method have high power and energy density, high specific power and energy. They have high cycle life, even in deep discharge conditions, and can be manufactured cheaply with conventional technology.

In a bipolar battery it is important for efficient discharge at high rates that the monopolar or end electrodes have excellent planar conductivity. By this invention monopolar plates can be made by substituting for one side of the mould a flat plate and then placing a metallic grid or mesh in the mould before the uncured resin and the suboxide materials are placed in the mould. When the mould is closed and the resin is cured, the metal grid or mesh will be pressed into one side of the formed electrode, giving it excellent planar conductivity for the purposes of a monopolar or end plate. Of course, the metal grid or mesh should not be exposed to the electrolyte otherwise it will corrode. Preferably metal studs are electrically attached to the metal grid or mesh to provide terminal connections. Lead or lead alloy foils can also be advantageously applied to the reverse face of the electrode in the mould instead of the metal grid or mesh to provide good planar conductivity for the monopolar or end electrodes.

Metal plates, grids or meshes may be advantageously incorporated into the bipolar plates in order to increase the planar conductivity and ensure good current distribution over the full area of the electrodes. Cooling channels can be introduced into the bipolar plates in like manner.

In a preferred aspect of the invention all parts may be joined into a single jig, but they may also be provided singly or in arrangements with two or more parts. Preferably three parts are arranged in line. Preferably each part, either when provided singly or in combination, has vacuum means.

The composition may be in the form of a liquid, gel, granules, chips, powder, flakes or other form and optionally contains conductive and/or non-conductive filler in the form of powder, fibres, granules, beads, flakes or chips.

BRIEF DESCRIPTION OF SEVERAL VIEWS OF THE DRAWINGS

In order that the invention may be well understood it will now be described by way of illustration with reference to the accompanying diagrammatic drawings, in which.

DETAILED DESCRIPTION OF THE PREFERRED EMBODIMENTS

Figure 1:
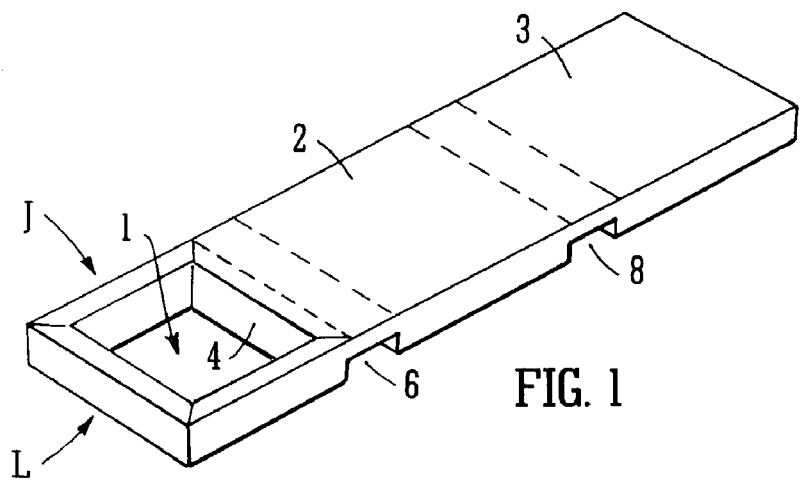
FIG. 1 is a perspective view of a three part jig of the invention.
Figure 2:
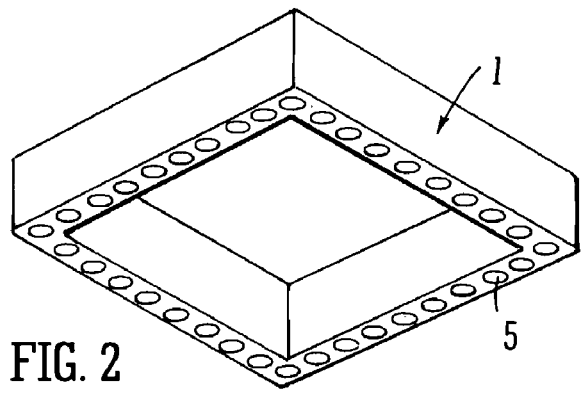
FIG. 2 shows the underside of the first part of the jig.

Referring to FIGS. 1 and 2, there is shown a jig J comprising a body made of a light low density metal such as aluminium, or any other material suitable for the operating temperature low density material is preferred so that the jig is more easily handled. The jig J comprises up to three parts or zones, these are a frame 1 to receive a composition, an optional foil or sheet lid applicator 2, and an optional pick up device 3. In the embodiment discussed below, all three parts 1, 2, 3 are present.

Figure 3B:
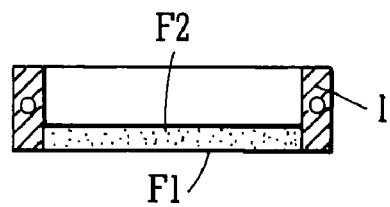
FIG. 3B shows a second embodiment of a stage of advancing an open container to a mould.
Figure 3A:
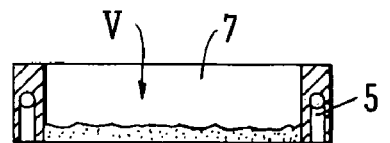
FIG. 3A shows a stage of advancing an open container to a mould.
Figure 3A:
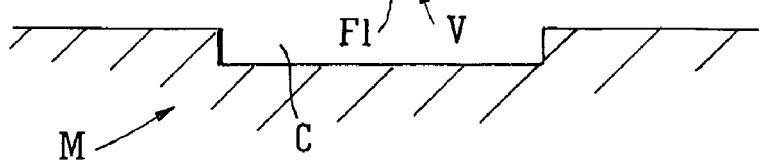

At a leading end L the jig comprises the open frame 1 which is fractionally smaller than the size of a cavity C of a mould M (FIG. 3A). The frame 1 has an open bottom 4. Around the periphery of the lower side of the frame (as shown in FIG. 2) are holes 5 to which a vacuum can be applied from inside the frame 1. If it is required that the part to be formed is large, or the foil is heavy, extra vacuum can be applied in the centre of the frame 1, by having intermediate frame elements equipped with vacuum pipes The frame 1 can therefore be used to pick up and carry a foil or sheet F1 on its underside (FIG. 3). A slot 6 may be present on the underside of the jig to define space between the frame 1 and the lid applicator 2.

As seen in FIG. 3A, the presence of the foil or sheet F1 closes the bottom opening of the frame and effectively transforms the frame into an open top container or vessel V to receive a measured aliquot of a heat-curable resin composition 7. The composition 7 can be spread across the area of the vessel V by a doctor blade or similar, or by shaking or vibrating, or evenly dispensed by a funnel arrangement, possibly with a wide spout being moved over the appropriate area of the vessel V.

The foil F1 may be made of any metal or alloy used in batteries, fuel cells, electrochemical treatment devices or reactors, for example lead or a lead alloy, nickel or nickel alloy or at least one of the foils comprises a metal from the group platinum, gold, silver, palladium, rhodium, yttrium, iridium, ruthenium, zinc, osmium, rhenium, tantalum, bismuth, antimony, tin, vanadium, cobalt, cerium, aluminium, titanium, copper, indium, or an alloy thereof. In a variation, the foil F1 is replaced by a sheet such as paper label, plastic film or a laminate of different metals, e.g. lead and copper or nickel or their alloys. In another variation the foil F1 is replaced by a paper label.

The lid applicator 2 also has vacuum holes, not shown, to hold a foil or sheet lid F2 on its underside and may be separated by a slot 8 from the pick up device 3. The lid applicator 2 is used to place the second foil or sheet F2 on top of the heat curable resin composition 7 in the mould cavity C.

The pick-up device 3 (not shown in cross section) is also equipped with vacuum holes and is advantageously used to pick up and remove any finished part from the mould M at the start of each cycle. Other methods of ejection of the part, such as ejector pins can also be used.

Fast cavity loading proceeds as follows: a vacuum is drawn via the holes 5 in the frame 1 to draw foil or sheet F1 on to the frame 1 of the jig J to provide the vessel V. The curable composition 7 is added as shown in FIG. 3A. The lid applicator 2 of the jig J is optionally moved to a location where it can be, and is, similarly loaded with the second foil or sheet F2. Both foils may be loaded simultaneously at parts 1 and 2 of the jig J. The jig J may also advantageously comprise cutting devices such as retractable cookie cutters fitted to aid cutting of the foil to size from, for example, a roll of foil material.

Figure 4:
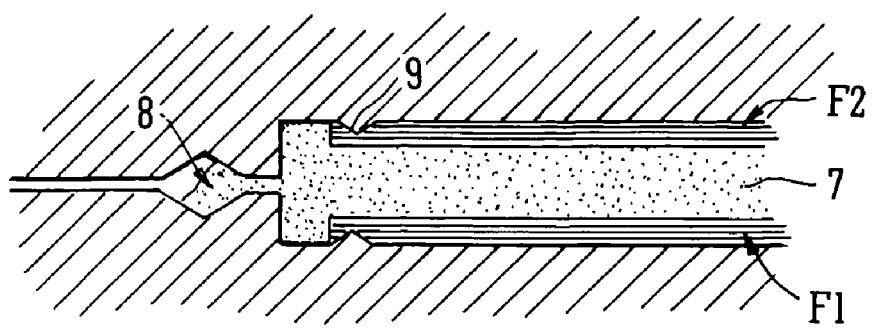
FIG. 4 is a vertical section of a mould following closure and the application of heat and pressure.

When loaded in this way, the jig J is moved until the pick up device 3 is presented to the open and heated cavity which contains a previously cured part, which is attached to the pick up device 3, by a vacuum, following which the jig J is raised vertically to remove the finished part from the mould cavity. The frame 1 having its foil or sheet F1 containing the composition 7 is presented to and placed in or a short distance above the cavity C of the heated mould M. Guide pins, not shown, may be used to locate the vessel V accurately. The vacuum is then released so that the foil or sheet F1 and the heat curable composition 7 locates or remains in the cavity C as frame 1 is lifted vertically. Jig J is then quickly moved (to the left as shown) until the lid applicator 2, previously loaded with the second foil or sheet F2, is presented to the cavity C, and its vacuum is released. The foil or sheet F2 falls or locates on to the loaded composition 7. Applicator 2 is lifted vertically, leaving the second foil or sheet F2 on top of the composition 7. The jig J is moved away so that the tool housing the mould M can be closed. The time between the heat curable composition 7 being placed in the heated cavity C and the cavity being closed and pressure applied can, by this method, be as short as about 3 seconds and no more than 10 seconds, ensuring that the effects of premature curing are minimised. As shown in FIG. 4, the closed mould period, the resin liquefies and flows to the extremities of the cavity C. Preferably, some flash is formed to ensure that the cavity C is completely filled and flash pockets 8 can be advantageously designed into the mould M for this purpose. The cavity C may advantageously have slightly raised resin seal structures (9) in parts of the mould M to restrict the possible flow of liquid resin over the ends of the foil or sheet F1, F2 during the curing process.

During the curing period, the jig J can be advantageously moved to a location to deposit the previously cured part for finishing and further processing as required. Frame 1 and the lid applicator 2 are then moved to a loading station and are recharged with foils or sheets F1, F2 and an aliquot of composition 7. When the curing time is completed, the tool is opened. Immediately the cycle then restarts, as described above.

The invention is not limited to the above embodiment. The parts of the jig J may be separate. The foil or sheet F1 may be the same size as the cavity C; in some cases, advantageously it may be several mm smaller than the size of the cavity C. The second foil or sheet F2 may be slightly smaller than the first foil or sheet F1, in which case the second foil or sheet F2 can be placed on top of the composition 7 in the vessel V as shown in FIG. 3B.

The jig J may also carry nozzles for the periodic application of mould release agent, or brushes for periodic cleaning of the mould cavity.

Figure 8:
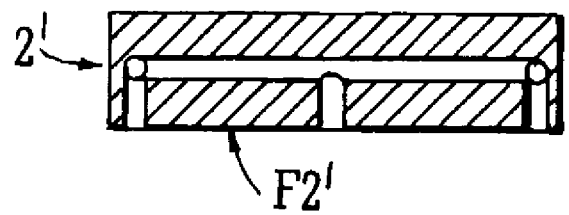
FIG. 8 is a sectional view of an embodiment of a closure port according to the invention.

In another method the second foil or sheet F2' can be picked up by a vacuum system, a second part of the jig—in a way analogous to the first foil or sheet on Part 1, but in this case there is no requirement for part 2' to consist of a frame. Part 2' (see FIG. 8) is similarly sized, i.e. slightly smaller than the size of the cavity to be loaded.

Figure 5:
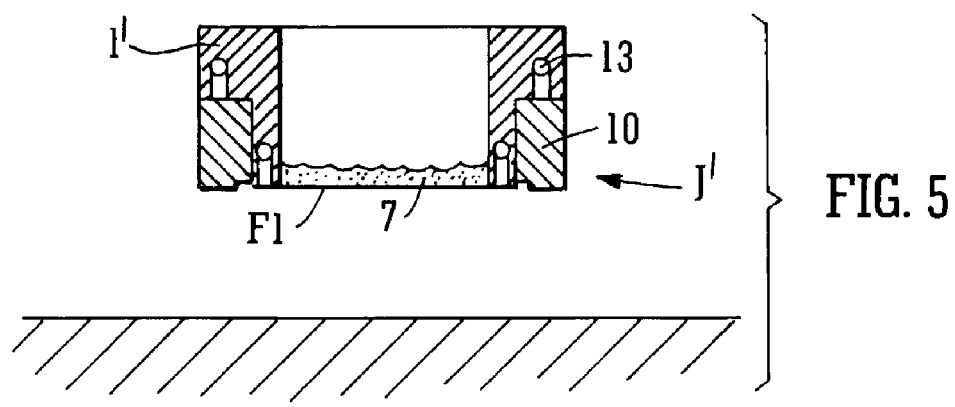
FIG. 5 shows a variation of the first part of the jig.
Figure 6:
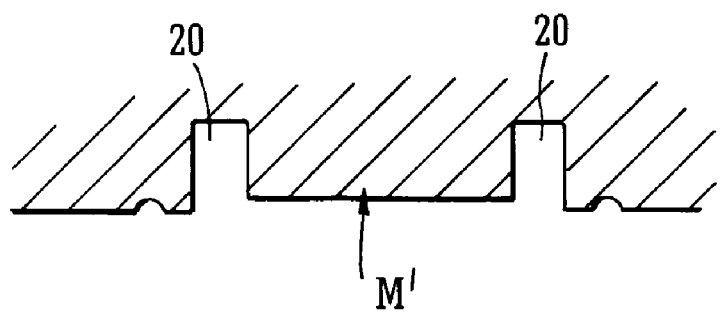
FIG. 6 is a sectional view of a mould.
Figure 7:
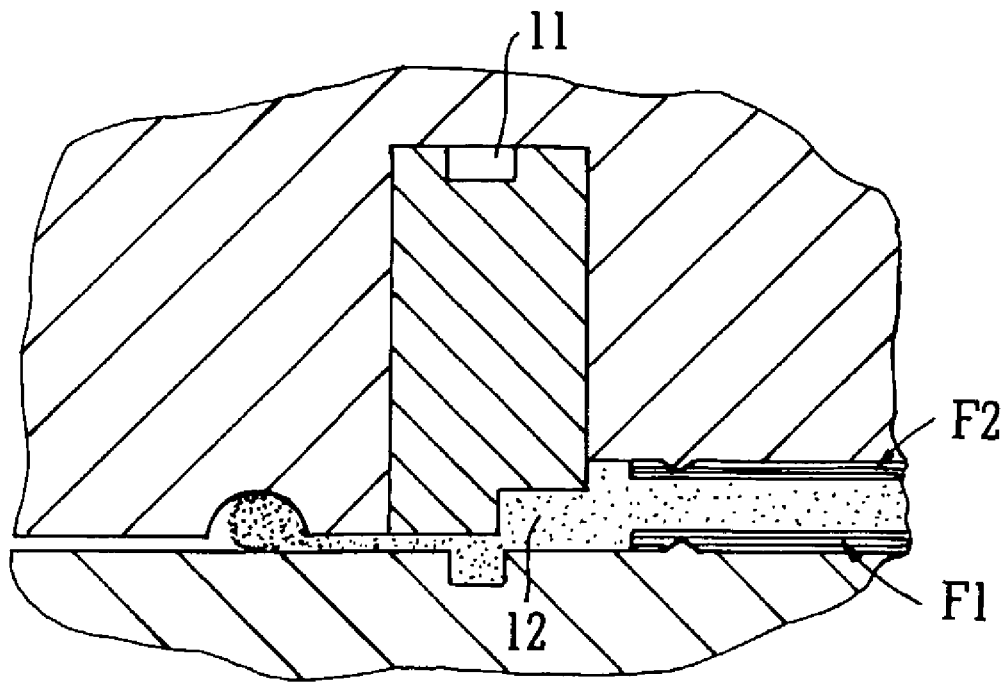
FIG. 7 is a sectional view of a mould in use.

Referring to FIGS. 5 to 7, in a variation, a previously shaped plastic frame 10 can also be loaded into the mould cavity C by part 1' of the Jig J', in a secondary action after (or before) picking up the first foil or sheet F1. This would require an additional vacuum system 13 to be applied, and also a con-cavity 20 to receive the preformed plastic frame in at least one part of the mould M'. The preformed plastic frame 10 may contain other features such as holes and valves, which could be of importance should the finished part be utilised in a bipolar electrochemical cell or battery.

FIG. 5 shows an arrangement whereby an extra vacuum system 13 is applied in part 1 of jig J to hold the preformed plastic frame part 10, When part 1' of the jig J' is presented to the mould cavity as described above, both vacuums are released; depositing foil or sheet F1, the heat curable composition 7 and the premoulded frame 10 into the cavity C. After optionally placing the second foil or sheet F2, the counterpart of the mould tool is applied to close the cavity. FIG. 7 shows a detail of how the closed mould tool, the foils or sheets F1, F2, the heat curable composition 7 and the preformed frame 10 would appear in cross section whilst the heat and pressure are being applied. FIG. 7 also illustrates an optional possibility of a tongue feature 12 being moulded into the heat curable composition which has a counterpart groove feature in the preformed frame 10 to facilitate assembly of a muticell electrochemical cell or battery.

In order to further exemplify the invention, reference is made to the following Example in which the production of a 1 mm thick 150 mm×110 mm plate comprising an Ebonex (RTM) ceramic filled resin composite having lead foil on both faces will be described.

Example 1

Ebonex ceramic is an electrically conductive ceramic material comprising Magnéli phase suboxides of titanium and is manufactured by Atraverda Limited, Roseheyworth Business Park, Abertillery, Gwent, NP13 1SX, UK.

A two-compartment jig J of the type depicted in FIG. 1 was fabricated from aluminium and connected to a vacuum pump by a series of pipes and valves such that vacuum could be independently applied and released to the holes 5 on the underside of the frame 1 and to holes on the underside of section 2 of jig J.

Thin lead foil F1 was cut to the requisite size and placed against the holes 5 in frame 1. A vacuum was applied to the holes in order to hold the foil securely in position and a second foil F2 was positioned against the vacuum holes on the underside of section 2 of jig J. An amount of a 1:1.5 weight ratio mixture of a thermoset resin/hardener combination and Ebonex powder was placed in the cavity formed in frame 1 by the foil F1.

A multi-part mould tool had been bolted to the upper and lower platens of an up-stroking compression press and pre-heated to 200° C. The jig J was then advanced into the throat of the press and positioned over the cavity in the base of the mould tool. The vacuum to section 1 of jig J was released allowing the charge of lead foil and Ebonex ceramic-resin to be placed in to the mould cavity while maintaining the vacuum applied to the foil in contact with section 2. The position of the jig J was then altered to position section 2 of the jig J over the mould cavity. The vacuum to section 2 was then released thereby detaching the second lead foil to lie directly on the upper surface of the Ebonex powder-resin mixture contained within the mould cavity. The jig J was then lifted clear of the mould base and completely removed from the throat of the press. The press platens were then closed and the charge pressed at 200° C. for around 1 minute and at a pressure sufficient to produce a 1 mm thick plate.

Following the opening of the press the resulting formed plate and associated flash was rapidly ejected and stripped from the mould tooling and placed on a flat surface to cool to ambient temperature. The moulded plate was deflashed and was suitable for use as a bipolar electrode in a bipolar lead-acid battery.

It will be appreciated that multiple jigs J may be mounted in a side-by-side or other arrangement to allow loading of multiple mould cavities C at the same time.

The invention claimed is:

1. A method of making an article comprising a heat cured composition with at least one foil or sheet applied on one face of the cured composition, the method comprising: advancing, to a heated mould, a vessel containing a heat curable composition, the vessel having an open bottom, a first foil or sheet closing the open bottom of the vessel; releasing the foil or sheet and causing the heat curable composition to locate in the heated mould cavity closing the heated mould for a period and applying pressure to form an article to the shape of the mould and to cure the composition; and withdrawing a formed article from the mould.

2. A method according to claim 1, wherein a second foil or sheet is placed on the top of the heat curable composition in the mould cavity before it is closed.

3. A method according to claim 2, wherein the first and second foils or sheets are of differing composition.

4. A method according to claim 1, wherein a second foil or sheet is placed on top of the heat curable composition in the vessel before the first foil or sheet is released.

5. A method according to claim 1, wherein the heat curable composition comprises a heat curable resin containing electrically conductive particles.

6. A method according to claim 5, wherein the electrically conductive particles comprise substoichiometric oxides of titanium.

7. A method according to claim 1, wherein the foil or at least one of the foils is of lead or a lead alloy.

8. A method according to claim 1, wherein the foil or at least one of the foils is of nickel or an alloy of nickel.

9. A method according to claim 1, wherein at least one of the foils comprises a metal from the group platinum, gold, silver, palladium, rhodium, yttrium, iridium, ruthenium, zinc, osmium, rhenium, tantalum, bismuth, antimony, tin, vanadium, cobalt, cerium, aluminium, titanium, copper, indium, or an alloy thereof.

10. A method according to claim 1, wherein the foil, or at least one of the foils comprises a laminate of two or more dissimilar metals or alloys.

11. A method according to claim 10, wherein at least one of the foils comprises a laminate of lead or a lead alloy with a highly conductive metal such as copper or aluminium or alloys thereof.

12. A method according to claim 1, wherein the foil, or at least one of the foils, is replaced by a sheet of material such as a paper label or plastic film.

13. A method according to claim 1, wherein a two part jig is used to move the heat curable composition towards and away from the mould cavity, the jig having a first part to provide the vessel containing the composition, and a second part to withdraw the formed article from the mould.

14. A method according to claim 13, wherein the parts of the jig are arranged in line.

15. A method according to claim 13, wherein the parts of the jig are arranged in around a central axis which rotates to present each part in succession to the mould cavity.

16. A method according to claim 1, wherein a two part jig is used to move the heat curable composition towards the mould cavity and to apply a second toil or sheet to the vessel, the jig having a first part to provide the vessel containing the composition, and a second part to deposit a second foil or sheet on top of the composition.

17. A method according to claim 1, wherein a three part jig is used, the jig having a first part to provide the vessel containing the composition and to move the heat curable composition to the mould cavity, a second part to place a foil or sheet lid on top of the heat curable composition in the heated mould cavity and a third part to withdraw the formed article from the mould cavity.

18. A method according to claim 1, wherein one or more parts of the jig includes vacuum means.

19. A method according to claim 18 where the vessel has preformed holes for the application and removal of the vacuum.

20. A method according to claim 19, wherein the mould cavity is shaped to introduce a tongue or groove structure to be moulded into the heat curable composition.

21. A method according to claim 1, wherein a preformed frame is carried by the vessel, and placed in the mould cavity at the same time as the first foil or sheet and the heat curable composition.

22. A method according to claim 1, comprising advancing a plurality of vessels simultaneously to the heated mould or to a respective plurality of heated moulds, each vessel having a bottom closed by a foil or sheet and having an aliquot of heat-curable composition located therein; locating each aliquot of composition into the or a heated mould, closing the or each heated mould and withdrawing a plurality of formed articles from the or each respective heated mould.

* * * * *